(12) United States Patent
Wang et al.

(10) Patent No.: US 10,282,020 B2
(45) Date of Patent: May 7, 2019

(54) TOUCH SUBSTRATE AND MANUFACTURING METHOD THEREOF, AND TOUCH DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Tengli Wang, Bejing (CN); Jianming Jiang, Beijing (CN); Chaohui Pan, Beijing (CN); Jizhong Cheng, Beijing (CN); Yudong Wei, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 17 days.

(21) Appl. No.: 15/522,549

(22) PCT Filed: Sep. 29, 2016

(86) PCT No.: PCT/CN2016/100696
§ 371 (c)(1),
(2) Date: Apr. 27, 2017

(87) PCT Pub. No.: WO2017/067377
PCT Pub. Date: Apr. 27, 2017

(65) Prior Publication Data
US 2017/0336911 A1    Nov. 23, 2017

(30) Foreign Application Priority Data
Oct. 23, 2015    (CN) .......................... 2015 1 0696464

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/13439* (2013.01);
(Continued)

(58) Field of Classification Search
None
See application file for complete search history.

(56) References Cited

U.S. PATENT DOCUMENTS

2016/0026287 A1* 1/2016 Xu ........................ H05K 999/99
345/174
2016/0202588 A1* 7/2016 Bass ....................... G02F 1/155
359/265

FOREIGN PATENT DOCUMENTS

CN        103135310 A     6/2013
CN        203084688 U     7/2013
(Continued)

OTHER PUBLICATIONS

Dec. 22, 2017—(CN) Second Office Action Appn 201510696464.5 with English Tran.

(Continued)

*Primary Examiner* — Kenneth B Lee, Jr.
(74) *Attorney, Agent, or Firm* — Banner & Witcoff, Ltd.

(57) ABSTRACT

A touch substrate and manufacturing method thereof, and touch display device are provided. The touch substrate, including: a base substrate including a touch region and a frame region; a touch electrode pattern disposed in the touch region of the base substrate; and an electrochromic structure disposed in the frame region of the base substrate. The touch substrate achieves color changing in the frame region, thereby solving the problem of single color in the frame region of the display device.

14 Claims, 1 Drawing Sheet

(51) Int. Cl.
  *G02F 1/1335* (2006.01)
  *G02F 1/1343* (2006.01)
  *G02F 1/153* (2006.01)
  *G02F 1/155* (2006.01)
  *G02F 1/157* (2006.01)
  *G06F 3/044* (2006.01)

(52) U.S. Cl.
  CPC ........ *G02F 1/133512* (2013.01); *G02F 1/153* (2013.01); *G02F 1/155* (2013.01); *G02F 1/157* (2013.01); *G02F 1/1533* (2013.01); *G06F 3/044* (2013.01); *G06F 3/0412* (2013.01); *G06F 2203/04103* (2013.01); *G06F 2203/04111* (2013.01)

(56) References Cited

FOREIGN PATENT DOCUMENTS

| | | |
|---|---|---|
| CN | 103353815 A | 10/2013 |
| CN | 203311396 U | 11/2013 |
| CN | 105278749 A | 1/2016 |
| CN | 205050120 U | 2/2016 |
| KR | 20120055366 A | 5/2012 |

OTHER PUBLICATIONS

Jan. 5, 2017—(WO) International Search Report and Written Opinion Appn PCT/CN2016/100696 with English Tran.
Sep. 13, 2017—(CN) First Office Action Appn 201510696464.5 with English Tran.

\* cited by examiner

TOUCH SUBSTRATE AND MANUFACTURING METHOD THEREOF, AND TOUCH DISPLAY DEVICE

This application is a U.S. National Phase Entry of International Application No. PCT/CN2016/100696 filed on Sep. 29, 2019, designating the United States of America and claiming priority to Chinese Patent Application No. 201510696464.5 filed on Oct. 23, 2015. The present application claims priority to and the benefit of the above-identified application and the above-identified application are incorporated by reference herein in their entirety.

TECHNICAL FIELD

Embodiments of the present disclosure relate to a touch substrate and a manufacturing method thereof, and a touch display device.

BACKGROUND

As a new technology, touch technology acts as one of the media for man-machine interaction to enable a person to input signals to a machine without a mouse and a keyboard and have become the most immediate, convenient and effective input mode by now. There are many types of touch technologies that can be implemented, and the demand of an operator to input signals to a machine can be satisfied by choosing the suitable technology and design, so that the operator can input complex signals only by touching the display device with his/her fingers.

With the rapid development of new technologies, people's demand for touch screens is increasing and their technical requirements for the touch technologies are getting higher and higher. With the trend of being lighter and thinner, a touch display can be manufactured on a layer of glass by an OGS (one glass solution) process, i.e. a conducting film and a sensor are formed directly on a protective glass, which, as one sheet of glass, has a dual role of both protection and touch sensing. With the OGS structure of a touch screen, the cost of one layer of glass and one time of boding are saved, the weight and thickness are reduced, and the light transmittance is improved, making the structure a choice for terminals of premium brands.

SUMMARY

Embodiments of the present disclosure provide a touch substrate and manufacturing method thereof, and a touch display device to make the color in the frame region can be changed.

Embodiments of the present disclosure provide a touch substrate, comprising: a base substrate comprising a touch region and a frame region; a touch electrode pattern disposed in the touch region of the base substrate; and an electrochromic structure disposed in the frame region of the base substrate.

Embodiments of the present disclosure further provide a manufacturing method of a touch substrate, comprising: forming a touch electrode pattern in a touch region of a base substrate; and forming an electrochromic structure in a frame region of the base substrate.

Embodiments of the present disclosure further provide a touch display device comprising a color changing controller and the touch substrate according to any one of embodiments of the present disclosure, wherein the color changing controller is configured to control color changing of the electrochromic structure.

DETAILED DESCRIPTION

Figure 1:
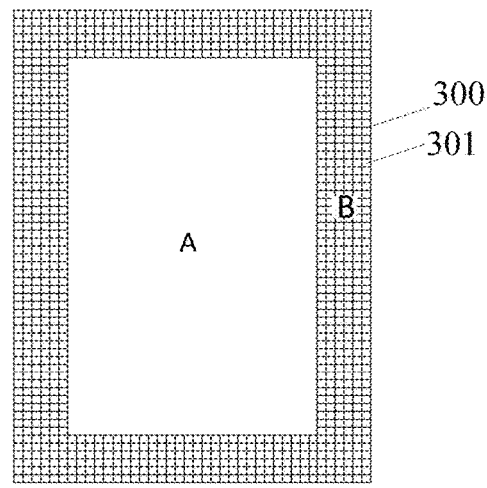
FIG. 1 is a structure diagram of a touch substrate provided in an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a conventional OGS display device, the color in the frame region is generally unchangeable, which is adverse to improvement of user experience.

In the first aspect, embodiments of the present disclosure provide a touch substrate, which includes a base substrate, a touch electrode pattern disposed in a touch region of the base substrate; and an electrochromic structure disposed in a frame region of the base substrate. The base substrate includes a touch region and a frame region surrounding the touch region.

The touch substrate provided in embodiments of the present disclosure can resolve the problem of the frame region of a display device having a single unchangeable color in conventional technologies.

In the second aspect, embodiments of the present disclosure provide a manufacturing method of a touch substrate, which can be used to manufacture the touch substrate in the first aspect and includes: forming a touch electrode pattern in the touch region of a base substrate; and forming an electrochromic structure in the frame region of the base substrate.

The physical structure of the touch substrate described above can take many forms, and the corresponding manufacturing methods can also be different, which will be explained with reference to accompanying figures in the following.

Figure 2:
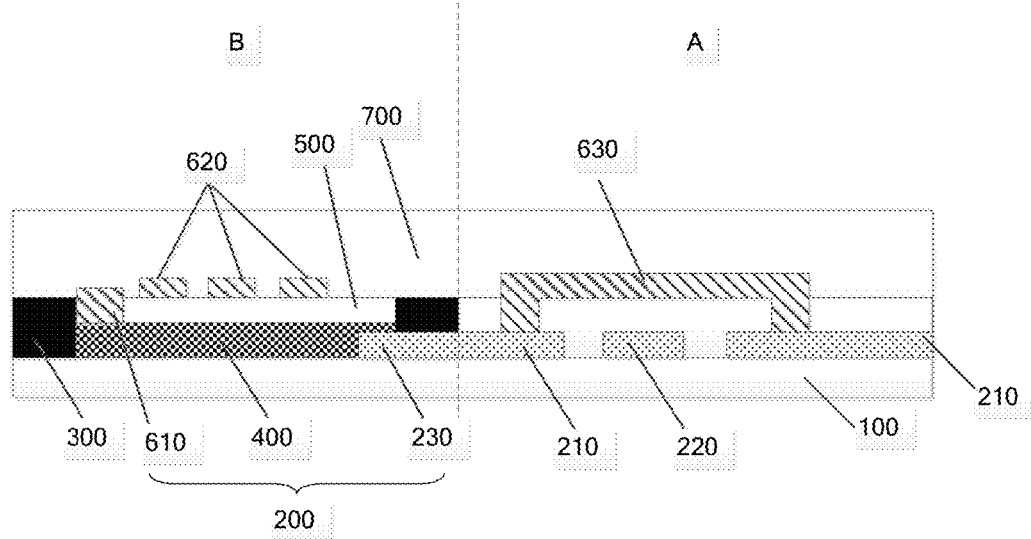
FIG. 2 is a cross-sectional diagram of a touch substrate provided in an embodiment of the present disclosure.

FIG. 1 and FIG. 2 are structure diagrams of a touch substrate provided in an embodiment of the present disclosure. As illustrated in the figures, the touch substrate includes a base substrate 100, a first touch electrode pattern 210 and a second touch electrode pattern 220 which are formed in a touch region A on the base substrate 100 and a first electrode 230 formed in a frame region B on the base substrate 100. For example, the first electrode 230 and the first touch electrode pattern 210 are formed in the same layer using the same material and are connected with each other.

In the frame region B, a light shielding pattern 300 is formed, the light shielding pattern 300 includes a plurality of crisscrossed light shielding stripes and a hollowed portion 301 is enclosed by adjacent crisscrossed stripes, and the first electrode 230 is filled in the hollowed portion which is enclosed by the light shielding pattern 300. In the hollowed portion, electrochromic material 400 is further formed on the first electrode 230 and the substrate 100. An insulating layer 500 is formed on the electrochromic material 400 in the frame region B and the first touch electrode pattern 210 and the second touch electrode pattern 220 in the touch region A.

In the frame region B, a portion of the electrochromic material 400 extends beyond the insulating layer 500, and the touch substrate further includes a second electrode 610 formed on the portion of the electrochromic material 400; a color changing control wiring 620 that is connected with the second electrode 610 (the connection is not illustrated in the figures) is further formed on the insulating layer 500 in the frame region B. For example, the second electrode 610 and the color changing control wiring 620 are manufactured using the same material, e.g. copper etc., which, however, is not limited herein.

In addition, a bridging electrode 630 is further included in the touch region A. Two first touch electrodes on both sides of a second touch electrode in the second touch electrode pattern 220 are connected together by the bridging electrode 630 across the second touch electrode. For example, the bridging electrode 630, the color changing control wiring 620 and the second electrode 610 can be formed in the same layer. A protective layer 700 is further formed on the color changing control wiring 620 and the bridging electrode 630. The protective layer can be made of an insulating material.

In the touch substrate provided in the embodiments of the present disclosure, a color changing structure is formed in the frame region to enable the color in the frame region to be changed. The color changing in the frame region can be achieved by applying an electrical control signal to the color changing control wiring.

In the touch substrate provided in the present embodiment, the first electrode 230, the second electrode 610 and the electrochromic material 400 constitute the electrochromic structure 200. A control voltage is applied on the color changing control wiring 620 to change the voltage difference between the first electrode 230 and the second electrode 610 and in turn change the color of the electrochromic material, so that the color in the frame region of the corresponding display device is changeable, solving the problem that the color in the frame region B of a display device in conventional technologies is unchangeable and improving user experience.

For example, in an embodiment of the present disclosure, the first electrode 230 is connected with the first touch electrode pattern 210, so that the voltage of the first electrode 230 is kept consistent with that of the first touch electrode pattern 210 and therefore there is no need to provide a separate color changing control wiring for the first electrode 230. Furthermore, because the first electrode 230 and the first touch electrode pattern 210 are disposed in one same layer and manufactured using the same material, they can be manufactured through one same patterning process, reducing the manufacturing difficulty of the touch substrate. Of course, the above mentioned first electrode 230 can also be connected with the second touch electrode pattern 220 and they can be manufactured in the same layer using the same material. In addition, the above-mentioned first electrode 230 can be neither connected with the first touch electrode pattern 210 nor connected with the second touch electrode pattern 220 described above and can be manufactured separately. At this point, the first electrode 230 and the first touch electrode pattern 210 or the second touch electrode pattern 220 described above can be in different layers and manufactured using different materials, the color changing control wiring connected with the first electrode 230 can also be manufactured separately, and the color changing control wiring connected with the first electrode 230 can also be manufactured in the same layer as the color changing control wiring connected with the second electrode 610, embodiments of the present disclosure are not limited thereto.

For example, in an embodiment of the present disclosure, the second electrode 610 and the color changing control wiring 620 are manufactured using the same material, and the second electrode 610 are located at a position where the electrochromic material 400 extends beyond the insulating layer 500, so that they can be manufactured through one same patterning process to reduce manufacturing difficulty. Likewise, embodiments of the present disclosure are not limited thereto, and other arrangements can be used.

For example, in an embodiment of the present disclosure, a light shielding pattern 300 is disposed in the frame region B and the above-mentioned electrochromic structure is disposed in the hollowed portion enclosed in the light shielding pattern. This arrangement has the advantage of preventing crosstalk interference between the colors of the above-mentioned electrochromic structure and those of the electrochromic structure in the touch region A and preventing the crosstalk interference between the color generated by one electrochromic structure and that by another electrochromic structure. In addition, the interference can affect display. It is not difficult to appreciate that although FIG. 1 illustrates a plurality of hollowed portions, in practical applications, there can be a larger hollowed portion to replace the above-mentioned hollowed portion, and this larger hollowed portion can be consistent with the frame region 300 in area size to make the whole frame region 300 emit light of one color.

For example, in the embodiment of the present disclosure, electrochromic material 400 in different hollowed portion can be different from each other, so that different colors can be displayed at different positions in the frame region B. In addition, when there is only one larger hollowed portion instead of individual hollowed portions as described above, i.e. only one electrochromic structure is included in the touch substrate, different electrochromic material can be disposed in different zones in the hollowed portion, which can equally enable different colors to be displayed at different positions in the frame region.

For example, the electrochromic material 400 described above can be organic electrochromic material including, such as, one or more of polythiophenes and their derivatives, viologens, tetrathiafulvalenes, Metal phthalocyanines and their derivatives, and polyanilines. Or the electrochromic material described above can be inorganic electrochromic material including, such as, one or more of tungsten trioxide, molybdenum trioxide, and vanadium pentoxide. The electrochromic material 400 is not limited to those listed above.

It is to be noted that FIG. 2 illustrates a structure diagram of the touch substrate at the border of the touch region A and the frame region B in FIG. 1, and the structure of the touch substrate at other positions in the frame region is similar to that in FIG. 2 except that on the side of the light shielding pattern near the touch region A is an electrochromic structure that is the same as the electrochromic structure on the side of the light shielding pattern 300 near the frame region instead of the first touch electrode pattern 210 and the second touch electrode pattern 220 as illustrated in FIG. 2. At this point, the first electrode of individual electrochromic structure that is not adjacent to the touch region can be connected with the touch electrode pattern through the first electrode of individual electrochromic structure adjacent to the touch region.

With respect to the touch substrate illustrated in FIGS. 1 and 2, in the manufacturing method described above, forming electrochromic structure in the frame region on the base substrate includes forming the first electrode, the second electrode and electrochromic material therebetween as well as the color changing control wiring connecting the first electrode and/or the second electrode in the frame region on the base substrate.

Furthermore, the process of forming the first electrode, the second electrode and the electrochromic material therebetween in the frame region on the base substrate includes: forming a light shielding pattern in the frame region on the base substrate; and in each hollowed portion of the light shielding pattern, forming a first electrode, forming electrochromic material on the first electrode and forming a second electrode on the electrochromic material.

For example, forming the electrochromic material in each hollowed portion of the light shielding pattern includes depositing the electrochromic material by a screen printing process.

For example, in the method described above, the process of forming the first electrode can include forming the first electrode in the same patterning process as the touch electrode pattern. In this way, manufacturing difficulty of the touch substrate can be reduced. For example, a material layer used to form the first electrode and the touch electrode pattern can be deposited on the base substrate, and then the deposited material layer can be etched by a patterning process to get the corresponding first electrode and touch electrode pattern.

Furthermore, when the above-mentioned touch substrate illustrated in FIGS. 1 and 2 is manufactured, the method described above can further include a process of forming an insulating layer on the electrochromic material, and the insulating layer allows a portion of the electrochromic material to extend beyond it. That is, a portion of the electrochromic material extends beyond the insulating layer.

At this point, in the method described above, the process of manufacturing the second electrode and the color changing control wiring can include forming the second electrode and the color changing control wiring by the same patterning process, wherein the second electrode is located on the portion of the electrochromic material extending beyond the insulating layer and the color changing control wiring is located on the insulating layer. In this way, manufacturing difficulty of the touch substrate can also be reduced. For example, a material layer used to form the second electrode and the color changing control wiring is deposited on the insulating layer and the electrochromic material uncovered by the insulating layer, and then the material layer is patterned to get the corresponding second electrode and the color changing control wiring.

In the third aspect, embodiments of the present disclosure further provide a touch display device including the touch substrate described in the first aspect and a color changing controller, which is connected with the color changing control wiring in the touch substrate to control the color changing of the electrochromic structure by controlling a voltage applied on the color changing control wiring. The color changing controller includes, for example, a color changing control device.

For example, the above-mentioned color changing controller can be located inside the touch driving circuit or can be a module separated from the touch driving circuit.

For example, the above-mentioned touch driving device can further include a detector, which is configured to generate a touch signal upon the touch electrode pattern being touched. The detector includes, for example, a detecting device.

At this point, the above-mentioned color changing controller is configured to control color changing of the electrochromic structure by controlling the voltage applied on the color changing control wiring when it receives a touch signal generated by the detector.

In this way, each time a touch occurs, the frame region can be controlled to present color changing, thereby improving user experience.

For example, the above-mentioned detector can be a touch driving circuit, which can be connected with the touch electrode pattern and send a touch driving signal to the touch electrode therein periodically. Generally, when a finger touch occurs at a coordinate position, the voltage on the touch electrode at the coordinate position can be caused to change, and the voltage changing can be detected by the touch electrode in the touch electrode pattern, so that it can be determined that a touch occurs at the coordinate position. Then the touch driving circuit can send a touch signal to the color changing controller, and which will be triggered to change the voltage applied on the color changing control wiring and thus change the color of the electrochromic structure.

For example, the touch display device can be any product or part with touch and display functionality such as an electronic paper, a cellphone, a watch, a tablet computer, a navigator or the like.

It is to be noted that, in embodiments of the present disclosure, the touch electrode pattern illustrated in FIG. 2 is only described as an example, and not limited thereto. For example, the first touch electrode pattern and the second touch electrode pattern can be formed in the same layer to act as a touch driving electrode and a touch sensing electrode respectively without using any bridging structures, or the first touch electrode pattern and the second touch electrode pattern can be located in different layers with an insulating layer formed therebetween. In the case that the first touch electrode pattern and the second touch electrode pattern are located in different layers with an insulating layer formed therebetween, the first electrode and the first touch electrode pattern can be formed in the same layer and the second electrode, the color changing control wiring and the second touch electrode pattern can be formed in the same layer.

It is to be appreciated that, in embodiments of the present disclosure, the patterning or patterning process can only include a photolithographic process, both a photolithographic process and an etching step, or printing, ink jetting or any other processes used to form a predetermined pattern. The photolithographic process refers to a process for forming a pattern consisting of film forming, exposing, developing and the like using photoresist, mask plate, exposure machine etc. The corresponding patterning process can be selected based on the structures formed in the embodiments of the present disclosure.

In embodiments of the present disclosure, "the same layer" can refer to a layer structure that is formed by forming a film layer used to form a particular pattern using one same film forming process and patterning the film layer through a one patterning process using one same mask plate. Depending on different particular patterns, the one patterning process can include multiple times of exposing, developing or etching, and the particular patterns in the resulted layer structure can be continuous or discontinuous, and furthermore can be located at different heights or have different thicknesses.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

This application claims the benefit of priority from Chinese patent application No. 201510696464.5, filed on Oct. 23, 2015, the disclosure of which is incorporated herein in its entirety by reference as a part of the present application.

What is claimed is:

1. A touch substrate, comprising:
   a base substrate comprising a touch region and a frame region;
   a touch electrode pattern disposed in the touch region of the base substrate;
   an electrochromic structure disposed in the frame region of the base substrate, wherein the electrochromic structure comprises a first electrode, a second electrode, and electrochromic material located therebetween;
   an insulating layer formed on the electrochromic material, wherein a portion of the electrochromic material extends beyond the insulating layer, and wherein the second electrode is formed on the portion of the electrochromic material extending beyond the insulating layer; and
   a color changing control wiring, disposed in the frame region of the base substrate and configured to control color changing of the electrochromic structure, wherein the color changing control wiring is formed on the insulating layer, and the second electrode and the color changing control wiring have a same material.

2. The touch substrate according to claim 1, wherein the color changing control wiring is connected with at least one of the first electrode and the second electrode.

3. The touch substrate according to claim 2, wherein the second electrode is connected with the color changing control wiring and the first electrode is connected with the touch electrode pattern.

4. The touch substrate according to claim 3, wherein the first electrode and the touch electrode pattern are formed in a same layer using a same material.

5. The touch substrate according to claim 1, further comprising a light shielding pattern formed in the frame region of the base substrate, wherein the light shielding pattern has at least one hollowed portion in which the electrochromic structure is filled.

6. The touch substrate according to claim 5, wherein the light shielding pattern comprises a plurality of crisscrossed light shielding stripes and the hollowed portion is enclosed by adjacent crisscrossed stripes.

7. The touch substrate according to claim 1, wherein the electrochromic material comprises organic electrochromic material or inorganic electrochromic material;
   the organic electrochromic material comprises at least one selected from the group consisting of polythiophenes and their derivatives, viologens, tetrathiafulvalenes, metal phthalocyanines and their derivatives, and polyanilines; and
   the inorganic electrochromic material comprises at least one selected from the group consisting of tungsten trioxide, molybdenum trioxide, and vanadium pentoxide.

8. A touch display device comprising a color changing controller and the touch substrate according to claim 1, wherein the color changing controller is configured to control color changing of the electrochromic structure.

9. A touch substrate, comprising:
   a base substrate comprising a touch region and a frame region;
   a touch electrode pattern disposed in the touch region of the base substrate; and
   an electrochromic structure disposed in the frame region of the base substrate,
   wherein the touch substrate further comprises a light shielding pattern formed in the frame region of the base substrate, wherein the light shielding pattern has at least one hollowed portion in which the electrochromic structure is filled,
   wherein the light shielding pattern comprises a plurality of crisscrossed light shielding stripes and the hollowed portion is enclosed by adjacent crisscrossed stripes, and
   wherein at least two electrochromic structures are disposed in the frame region, each of the electrochromic structures comprises a first electrode, a second electrode, and electrochromic material located therebetween, and the electrochromic material is different between the at least two electrochromic structures; or
   one electrochromic structure is disposed in the frame region, the electrochromic structure comprises a first electrode, a second electrode, and electrochromic material located therebetween, and the electrochromic material is different from each other at least at two positions.

10. A manufacturing method of a touch substrate, comprising:
   forming a touch electrode pattern in a touch region of a base substrate;
   forming an electrochromic structure in a frame region of the base substrate, wherein forming the electrochromic structure in the frame region of the base substrate comprises forming a first electrode, a second electrode, and the electrochromic material located therebetween in the frame region of the base substrate;
   forming a color changing control wiring in the frame region of the base substrate, wherein the color changing control wiring connects with at least one of the first electrode and the second electrode and is configured to control color changing of the electrochromic structure; and forming an insulating layer on the electrochromic material, wherein a portion of the electrochromic material extends beyond the insulating layer,
wherein forming the first electrode, the second electrode and the electrochromic material located therebetween in the frame region of the base substrate and forming the color changing control wiring configured to control the electrochromic structure comprises:
forming the second electrode and the color changing control wiring by one same patterning process, wherein the second electrode is located on the portion of the electrochromic material extending beyond the insulating layer and the color changing control wiring is located on the insulating layer.

11. The manufacturing method according to claim 10, wherein forming the first electrode, the second electrode and the electrochromic material located therebetween comprises
forming a light shielding pattern in the frame region of the base substrate, the light shielding pattern having at least one hollowed portion; and
in each hollowed portion of the light shielding pattern, forming a first electrode, forming electrochromic material on the first electrode, and forming a second electrode on the electrochromic material.

12. The manufacturing method according to claim 11, wherein forming the electrochromic material in each hollowed portion of the light shielding pattern comprises forming the electrochromic material by a screen printing process.

13. The manufacturing method according to claim 10, wherein forming the first electrode, the second electrode and the electrochromic material located therebetween comprises forming the first electrode in the same patterning process as the touch electrode pattern.

14. The touch display device according to claim 8, further comprising a detection member configured to generate a touch signal upon the touch electrode pattern being touched, wherein the color changing controller is configured to control the color changing of the electrochromic structure upon it receiving the touch signal generated by the detection member.

* * * * *